(12) United States Patent
Park et al.

(10) Patent No.: US 8,076,171 B2
(45) Date of Patent: Dec. 13, 2011

(54) MOLD AND MANUFACTURING METHOD FOR DISPLAY DEVICE

(75) Inventors: Dae-jin Park, Incheon (KR); Hyung-il Jeon, Incheon (KR)

(73) Assignee: Samsung Electronics Co., Ltd. (KR)

( * ) Notice: Subject to any disclaimer, the term of this patent is extended or adjusted under 35 U.S.C. 154(b) by 987 days.

(21) Appl. No.: 11/709,626

(22) Filed: Feb. 21, 2007

(65) Prior Publication Data

US 2007/0196940 A1    Aug. 23, 2007

(30) Foreign Application Priority Data

Feb. 23, 2006    (KR) .................. 10-2006-0017828

(51) Int. Cl.
*H01L 21/00*  (2006.01)
*H01L 33/00*  (2010.01)
(52) U.S. Cl. .............................. 438/70; 438/106; 257/98
(58) Field of Classification Search .................... 438/70, 438/106; 257/98
See application file for complete search history.

(56) References Cited

U.S. PATENT DOCUMENTS

| | | | |
|---|---|---|---|
| 6,190,929 B1 * | 2/2001 | Wang et al. | 438/20 |
| 7,161,731 B2 * | 1/2007 | Kanbe | 359/296 |
| 7,742,126 B2 * | 6/2010 | Kim et al. | 349/106 |
| 7,785,504 B2 * | 8/2010 | Chae et al. | 264/1.7 |
| 2003/0170423 A1 * | 9/2003 | Katsumoto et al. | 428/141 |
| 2004/0266307 A1 * | 12/2004 | McCoy et al. | 445/24 |
| 2006/0114377 A1 * | 6/2006 | Yen et al. | 349/106 |
| 2009/0109668 A1 * | 4/2009 | Isobe | 362/231 |

FOREIGN PATENT DOCUMENTS

| | | |
|---|---|---|
| CN | 1503011 A | 6/2004 |
| JP | 10-260413 | 9/1999 |
| JP | 2002-357713 | 12/2002 |
| JP | 2004-317766 | 11/2004 |
| JP | 2005-078052 A | 3/2005 |
| JP | 2005-301284 | 10/2005 |
| WO | 2004114002 A1 | 12/2004 |

* cited by examiner

*Primary Examiner* — Mathew Landau
*Assistant Examiner* — James M Mitchell
(74) *Attorney, Agent, or Firm* — Innovation Counsel LLP

(57) ABSTRACT

A mold for a display device, comprises a supporting frame; the supporting frame comprising at least one depressed pattern forming part on a first side of the supporting frame, and an organic layer removing part which is formed on a circumference of the pattern forming part, the pattern forming part depressed regions of different depths, the mold having light-blocking and light-transmitting portions corresponding to certain of the depressed pattern forming parts.

11 Claims, 36 Drawing Sheets

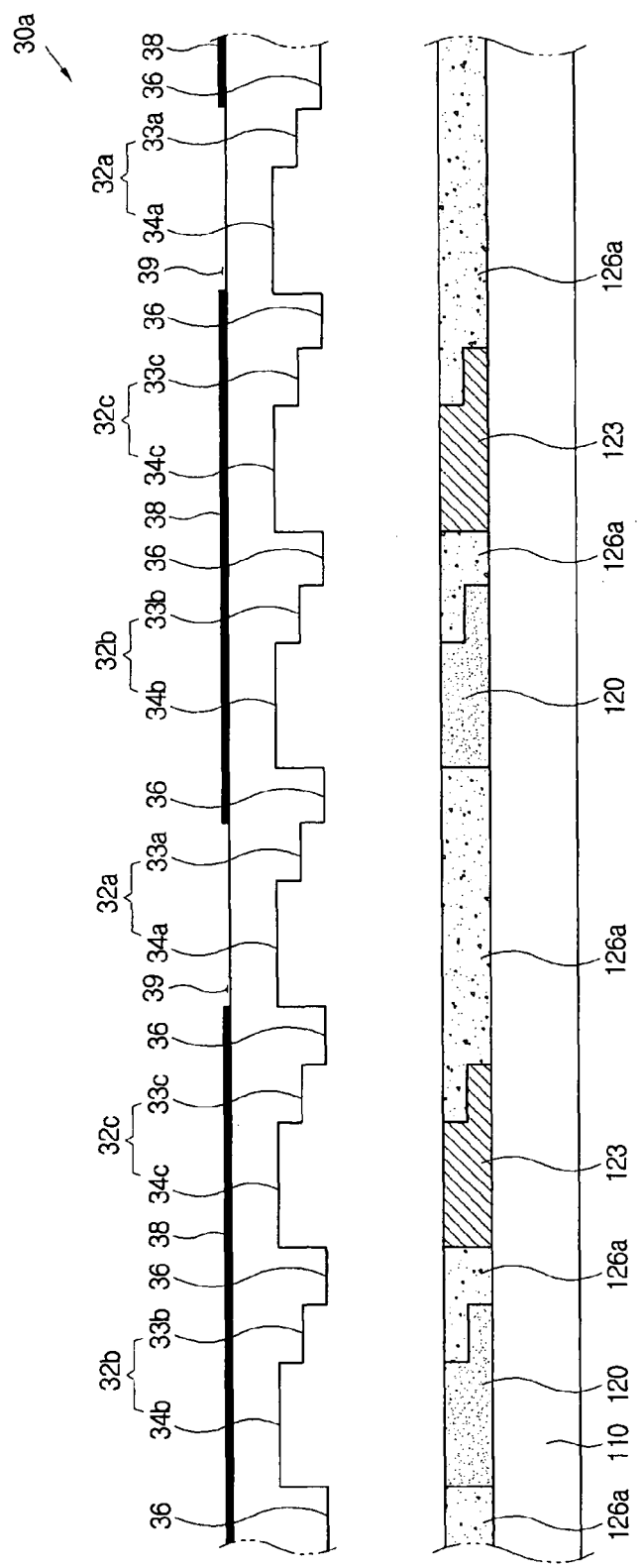

223 230 245 255 265

MOLD AND MANUFACTURING METHOD FOR DISPLAY DEVICE

CROSS-REFERENCE TO RELATED APPLICATIONS

This application claims the benefit of Korean Patent Application No. 2006-0017828, filed on Feb. 23, 2006, in the Korean Intellectual Property Office, the disclosure of which is incorporated herein by reference.

BACKGROUND OF THE INVENTION

1. Field of the Invention

The present invention relates to a mold for a display device and a manufacturing method of a display device using the same.

2. Description of the Related Art

A flat panel display device comprises a liquid crystal display (LCD) and an organic light emitting diode (OLED) device, etc. The LCD comprises a thin film transistor substrate, a color filter substrate on which a color filter is formed, and a liquid crystal panel which is interposed between the thin film transistor substrate and the color filter substrate. The respective substrates may comprise a metal layer, an inorganic layer and an organic layer that are patterned using photolithography processes.

When forming a color filter or a photosensitive layer having different thicknesses, complicated and slow processes including slit masking, halftone masking and exposure are performed at least twice.

SUMMARY OF THE INVENTION

According to one aspect of the present invention, a simplified method of manufacturing a display device is achieved using a mold comprising a supporting frame having at least one pattern forming part which is depressed on a first side of the supporting frame, and an organic layer removing part which is formed on the circumference of the pattern forming part, the pattern forming depressed regions of different depth.

According to an embodiment of the present invention, the pattern forming part is formed on the first side of the supporting frame as a stair shape.

According to the embodiment of the present invention, the mold comprises: a first mold, a second mold and a third mold each having the supporting frame, the first mold for the display device comprising one pattern forming part which is formed on the first side of the supporting frame, and the second mold comprising two pattern forming parts which are adjacent to each other and formed on the first side of the supporting frame, and the third mold comprising three pattern forming parts which are formed on the first side of the supporting frame and spaced from each other at a predetermined interval.

According to the embodiment of the present invention, the three pattern forming parts are repeatedly formed on the first side of the supporting frame and spaced from each other at a predetermined interval, and a light-blocking film having an opening part corresponding to one of the three pattern forming parts is formed on one of first and second sides of the supporting frame.

According to the embodiment of the present invention, the second region is provided as a pair, with the first region interposed therebetween.

According to the embodiment of the present invention, the second region is provided along a circumference of the first region.

The foregoing and/or other aspects of the present invention can be achieved by providing a mold for a display device, comprising a supporting frame, the supporting frame comprising at least one pattern forming part which is depressed on a first side of the supporting frame and an organic layer removing part which is provided on a circumference of the pattern forming part, the pattern forming part comprising a plurality of steps.

The foregoing and/or other aspects of the present invention can be achieved by providing a method of manufacturing a display device, comprising: forming a first color filter layer on an insulating substrate; pressing the first mold for the display device according to claim 3 toward the insulating substrate to form a first color filter; forming a second color filter layer on the insulating substrate; pressing the second mold for the display device according to claim 3 toward the insulating substrate to form a second color filter; forming a third color filter layer on the insulating substrate; and pressing the third mold for the display device according to claim 3 toward the insulating substrate to form a third color filter.

According to the embodiment of the present invention, the method further comprises: curing the first color filter after forming the first color filter and before forming the second color filter layer.

According to the embodiment of the present invention, the method further comprises: arranging the second mold for the display device so that one of two pattern forming parts corresponds to the first color filter, after forming the second color filter layer.

According to the embodiment of the present invention, the method further comprises: curing the second color filter after forming the second color filter and before forming the third color filter layer.

According to the embodiment of the present invention, the method further comprises: arranging the third mold for the display device so that two of the three pattern forming parts correspond to the first and second color filters, after forming the third color filter layer.

According to the embodiment of the present invention, the method further comprises: curing the third color filter after forming the third color filter.

According to the embodiment of the present invention, the method further comprises: removing a remaining layer between the first and second color filters, between the second and third color filters, and between the first and third color filters.

According to the embodiment of the present invention, the method further comprises: forming a black matrix between the first and second color filters, between the second and third color filters, and between the first and third color filters.

The foregoing and/or other aspects of the present invention can be achieved by providing a method of manufacturing a display device, comprising: forming a first color filter layer on an insulating substrate; pressing the mold for the display device according to claim 4 toward the insulating substrate to form a first color filter; exposing and curing the first color filter while pressing the mold for the display device and leaving the first color filter alone corresponding to an opening part; forming a second color filter layer on the insulating substrate; moving the mold for the display device according to claim 4 so that the pattern forming part adjacent to the opening part corresponds to the first color filter; pressing the mold for the display device according to claim 4 toward the insulating substrate to form a second color filter; exposing and curing the second color filter while pressing the mold for the display device and leaving the first and second color filters corresponding to the opening part; forming a third color filter layer on the insulating substrate; moving the mold for the display device according to claim 4 so that the pattern forming part adjacent to the opening part corresponds to the second color filter; and pressing the mold for the display device according to claim 4 toward the insulating substrate to form a third color filter.

According to the embodiment of the present invention, the method further comprises: exposing and curing the third color filter while pressing the mold for the display device.

According to the embodiment of the present invention, the method further comprises: removing a remaining color filter except the cured first to third color filters.

According to the embodiment of the present invention, the first color filter comprises a first reflector corresponding to a first region and a first transmission part corresponding to a second region, the second color filter comprises a second reflector corresponding to the first region and a second transmission part corresponding to the second region, and the third color filter comprises a third reflector corresponding to the first region and a third transmission part corresponding to the second region.

The foregoing and/or other aspects of the present invention can be achieved by providing a method of manufacturing a display device, comprising: forming a gate wire having a gate electrode on an insulating substrate; depositing a gate insulating layer, a semiconductor layer, an ohmic contact layer and a data metal layer consecutively on the gate wire; forming a photosensitive material layer on the data metal layer; arranging and pressing the mold for the display device according to claim 5, on the photosensitive material layer, and forming a photosensitive layer having a first portion corresponding to a first region and a second portion corresponding to a second region; and forming a thin film transistor through an etching method which uses the photosensitive layer.

According to the embodiment of the present invention, the first portion is thinner than the second portion, and the second portion is provided as a pair, with the first portion interposed therebetween.

According to the embodiment of the present invention, the gate wire comprises a gate line which extends in a predetermined direction, and a groove which is depressed on a first side of the mold for the display device and crosses the gate line when arranging the mold for the display device.

According to the embodiment of the present invention, the groove has a substantially same depth as the second region.

According to the embodiment of the present invention, the photosensitive layer further comprises a third portion corresponding to the groove.

BRIEF DESCRIPTION OF THE DRAWINGS

The above and/or other aspects and advantages of the present invention will become apparent and more readily appreciated from the following description of the embodiments, taken in conjunction with the accompany drawings, in which:

FIGS. 7*a* to 7*i* illustrate a manufacturing method of a color filter substrate according to a second embodiment of the present invention; and FIGS. 8*a* to 8*i* illustrate a manufacturing method of a thin film transistor substrate according to a third embodiment of the present invention.

DETAILED DESCRIPTION OF EMBODIMENTS

Figure 1A:
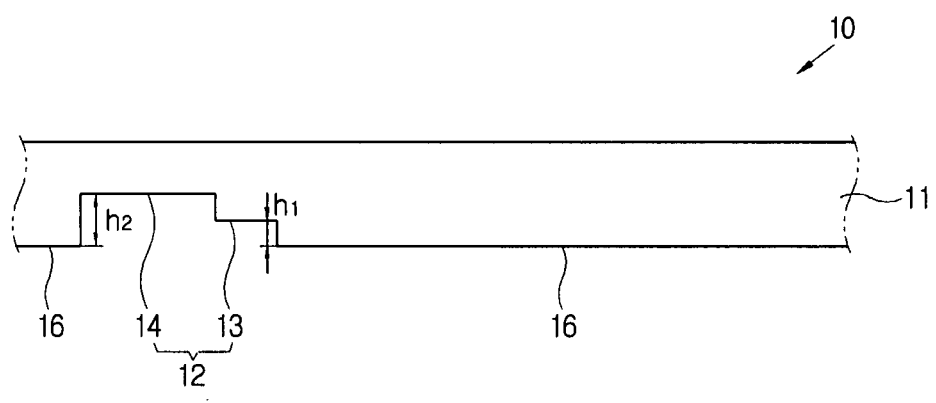
FIGS. 1*a* to 1*e* are sectional views of the molds for the display device according to the present invention.

Hereinafter, embodiments of the present invention will be described with reference to accompanying drawings, wherein like numerals refer to like elements and repetitive descriptions will be avoided as necessary.

Hereinafter, molds 10, 20, 30 and 40 for a display device according to the present invention will be described in detail.

As shown therein, the molds 10, 20, 30, 30*a* and 40 for the display device according to the present invention comprise supporting frames 11, 21, 31 and 41; at least one pattern forming part 12, 22*a*, 22*b*, 32*a*, 32*b*, 32*c* and 42 which are depressed on a first side of the supporting frames 11, 21, 31 and 41; and organic layer removing parts 16, 26, 36 and 46 which are formed on a circumference of the pattern forming parts. The pattern forming parts 12, 22*a*, 22*b*, 32*a*, 32*b*, 32*c* and 42 comprise first regions 13, 23*a*, 23*b*, 33*a*, 33*b*, 33*c* and 43 which are depressed to a predetermined depth; and second regions 14, 24*a*, 24*b*, 34*a*, 34*b*, 34*c* and 44 which are depressed more deeply than the first regions. That is, the pattern forming parts 12, 22*a*, 22*b*, 32*a*, 32*b*, 32*c* and 42 have a plurality of steps comprising first regions 13, 23*a*, 23*b*, 33*a*, 33*b*, 33*c* and 43 and second regions 14, 24*a*, 24*b*, 34*a*, 34*b*, 34*c* and 44. The pattern forming parts 12, 22*a*, 22*b*, 32*a*, 32*b*, 32*c* and 42 form desired patterns. The organic layer removing parts 16, 26, 36 and 46 remove the remaining areas where patterns are not formed.

FIGS. 1*a* to 1*d* illustrate the molds 10, 20, 30 and 30*a* for the display device used to form color filters 120, 123, 126 (refer to FIG. 3) of a color filter substrate 100 of a liquid crystal display device. More specifically, FIGS. 1*a* to 1*d* illustrate the molds 10, 20, 30 and 30*a* for the display device used to form a two tone color filter in a semi-transmission type LCD device, thereby improving reflection ratio and color realization. As shown therein, the pattern forming parts 12, 22*a*, 22*b*, 32*a*, 32*b*, 32*c* and 42 of the molds 10, 20, 30 and 30*a* for the display device have a stair shape depression on the first side of the supporting frames 11, 21 and 31.

Figure 1B:
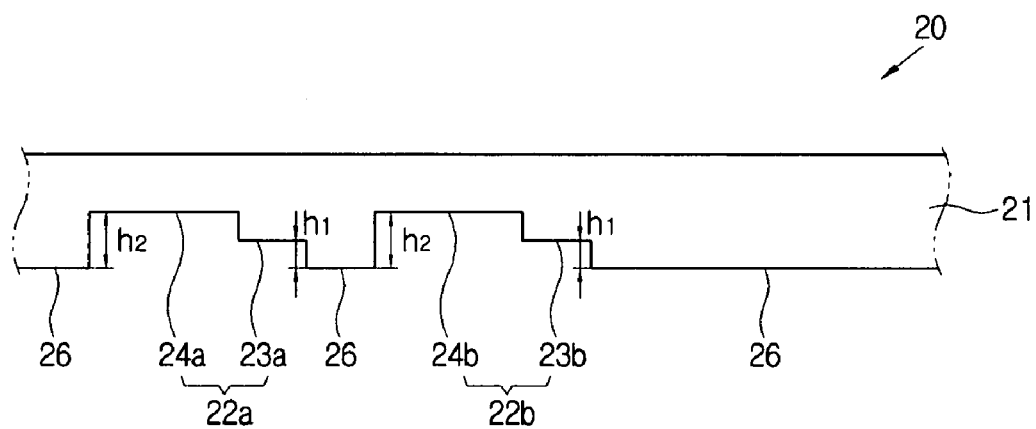
Figure 1C:
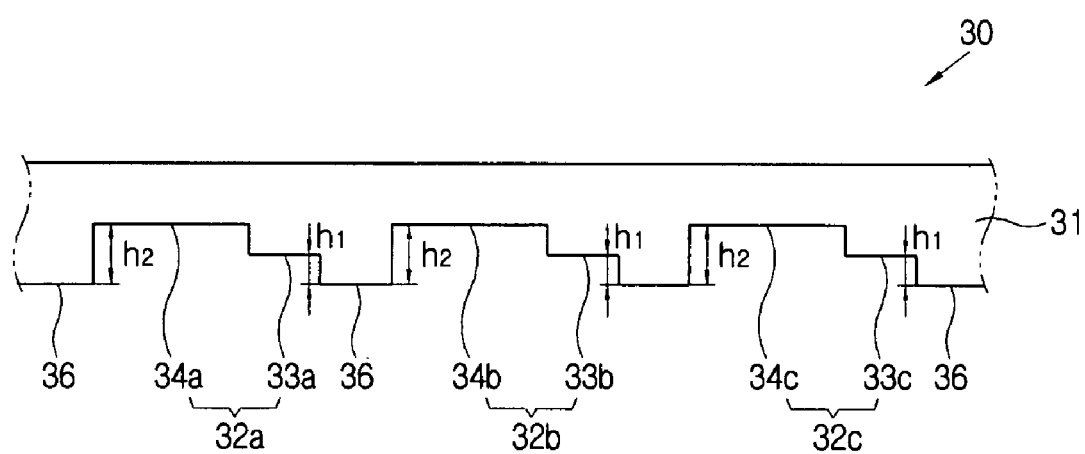

As shown in FIG. 1*a*, a first mold 10 comprises a pattern forming part 12 which is depressed on the first side of a supporting frame 11. The pattern forming part 12 comprises a first region 13 and a second region 14. The depth h2 of the depressed second region 14 is deeper than the depth h1 of the depressed first region 13. The first and second regions 13 and 14 are different in depth. As shown in FIG. 1*b*, a second mold for the display device 20 comprises two pattern forming parts 22*a* and 22*b* which are depressed on a first side of a supporting frame 21 and adjacent to each other. The pattern forming parts 22*a* and 22*b* are spaced from each other at a predetermined interval. The interval between them comprises an organic layer removing part 26 which corresponds to a black matrix 130 (to be described later). The pattern forming parts 22*a* and 22*b* comprise first regions 23*a* and 23*b* which are depressed to a predetermined depth h1 and second regions 24a and 24b which have depth difference to the first regions 23a and 23b and depressed to a depth h2 deeper than the first regions 23a and 23b, respectively. As shown in FIG. 1c, a third mold 30 for the display device comprises three pattern forming parts 32a, 32b and 32c which are depressed on a first side of a supporting frame 31 and spaced from each other at a predetermined interval. The interval therebetween comprises an organic layer removing part 36, and corresponds to the black matrix 130 (to be described later). The pattern forming parts 32a, 32b and 32c respectively comprise first regions 33a, 33b and 33c and second regions 34a, 34b and 34c which have a stair shape. The depth h2 of the depressed second regions 34a, 34b and 34c is deeper than the depth h1 of the depressed first regions 33a, 33b and 33c.

Figure 1D:
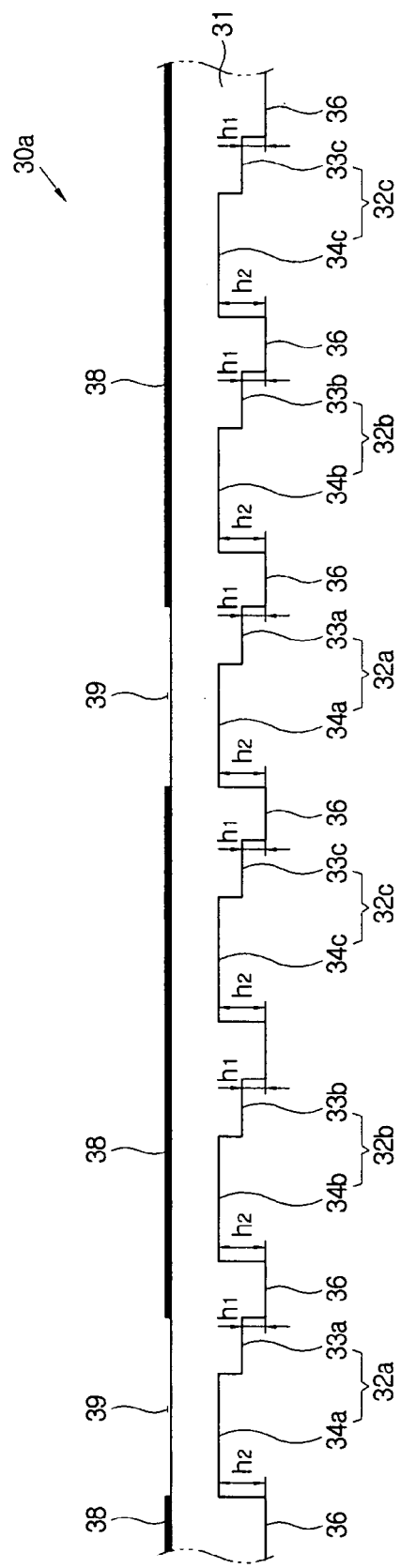

FIG. 1d illustrates a mold for a display device 30a which is used to form a two tone color filter with red, green and blue colors by using the mold for the display device 30a. For purposes of convenience, the same numerals will be assigned to the same elements as in FIG. 1c.

As shown in FIG. 1d, three pattern forming parts 32a, 32b and 32c are repeatedly formed on the first side of supporting frame 31. The pattern forming parts 32a, 32b and 32c are spaced from each other at a predetermined interval. The pattern forming parts 32a, 32b and 32c respectively comprise the first regions 33a, 33b and 33c which are depressed to the predetermined depth h1 and the second regions 34a, 34b and 34c which have a stair shape and are depressed to the depth h2 larger than the first regions 33a, 33b and 33c. The interval between the pattern forming parts 32a, 32b and 32c comprises the organic layer removing part 36.

A light-blocking film 38 having an opening part 39 is formed on a second side of supporting frame 31 to correspond to one of the pattern forming parts 32a, 32b and 32c. As shown in FIG. 1d, the light-blocking film 38 having the opening part 39 is formed on the second side of supporting frame 31 to correspond to the first-positioned pattern forming part 32a. Alternatively, the light-blocking film 38 may be formed on the first side of supporting frame 31 having the pattern forming parts 32a, 32b and 32c to block light. The area on which the color filter is not formed, is removed by the light-blocking film 38 without difficulty.

The pattern forming parts 12, 22a, 22b, 32a, 32b and 32c are shaped like a stair to form the two ton color filter.

Figure 1E:
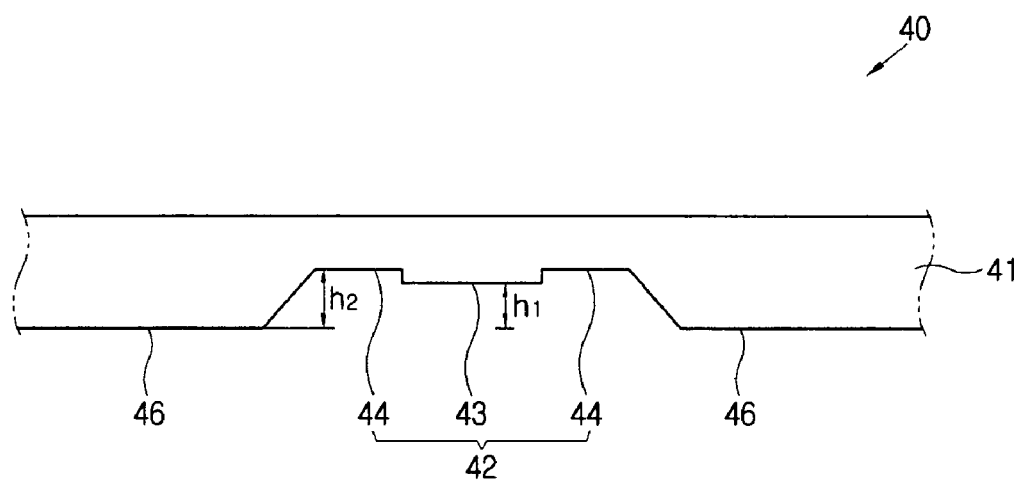

FIG. 1e illustrates a mold for the display device 40 used to form a photosensitive layer in different depth, thereby reducing the time of using a mask in manufacturing the thin film transistor. The mold for the display device 40 is used to form the photosensitive film in different depth to form a source electrode, a drain electrode, an ohmic contact layer and a semiconductor layer in a desired pattern. As shown in FIG. 1e, the mold for the display device 40 comprises a pattern forming part 42 having a first region 43 depressed to the predetermined depth h1 and a second region 44 provided as a pair with the first region 43 interposed therebetween. The depth h2 of the depressed second region 44 is deeper than the first region 43. The pattern forming part 42 is provided on a first side of the supporting frame 41. An organic layer removing part 46 is formed on a circumference of the pattern forming part 42 to remove the remaining areas except the pattern-formed area. The second region 44 may be provided on the circumference of the first region 43 according to the type of the source electrode and the drain electrode to be formed.

As described above, the molds for the display devices 10, 20, 30, 30a and 40 having the pattern forming parts 12, 22a, 22b, 32a, 32b, 32c and 42 having a plurality of depth difference may be used to form the desired pattern without the mask, thereby simplifying a process and improving an yield of the pattern.

Hereinafter, a method of manufacturing the display device using the mold for the display device according to the present invention will be described. Hereinafter, a term of "on" or "above" means that a new layer (i.e., film) may be interposed or not interposed between two layers (i.e., films), and a term of "directly on" means that two layers (i.e. films) are in contact with each other.

Figure 2:
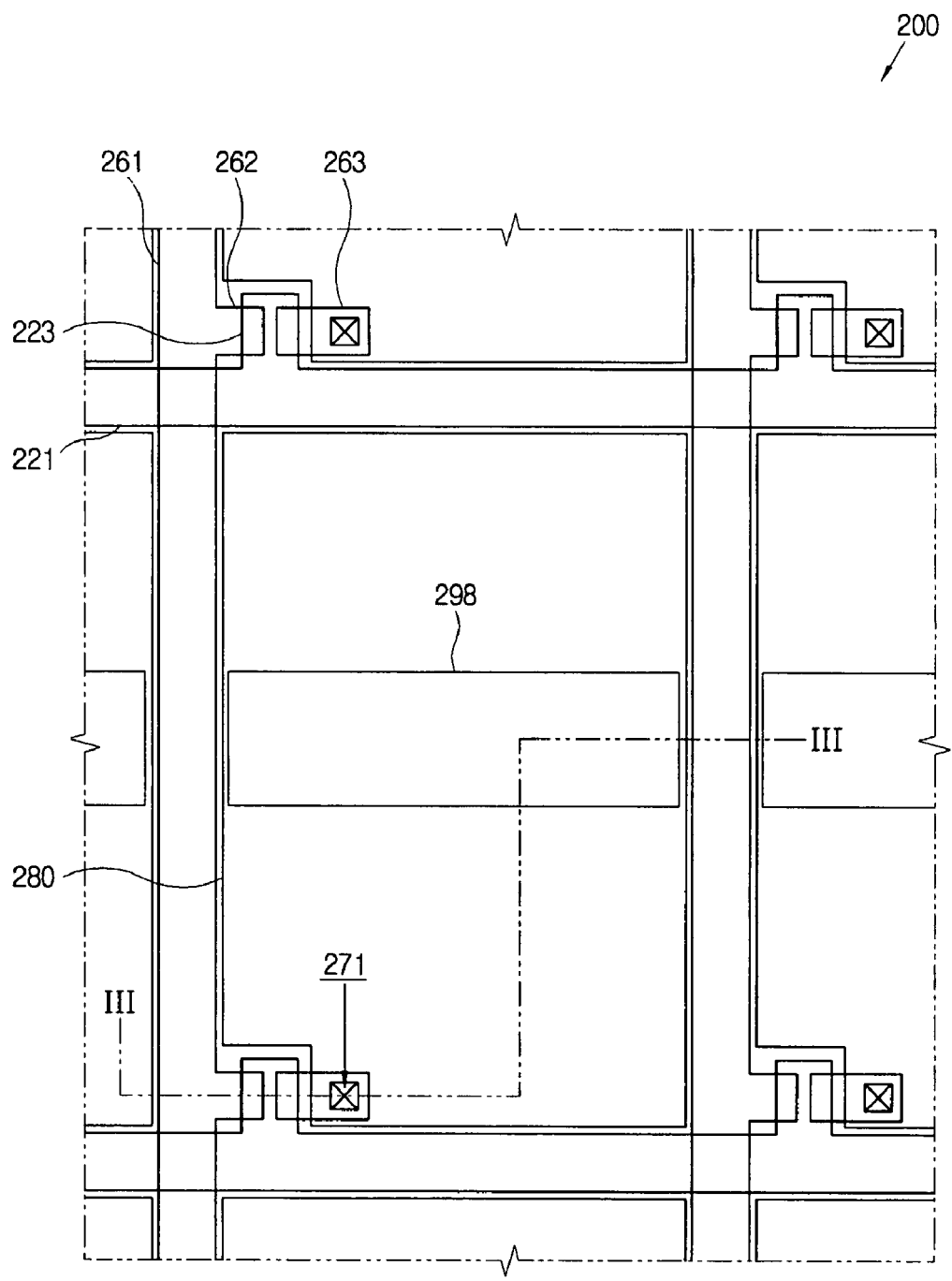
FIG. 2 illustrates a thin film transistor substrate according to the first embodiment of the present invention.
Figure 3:
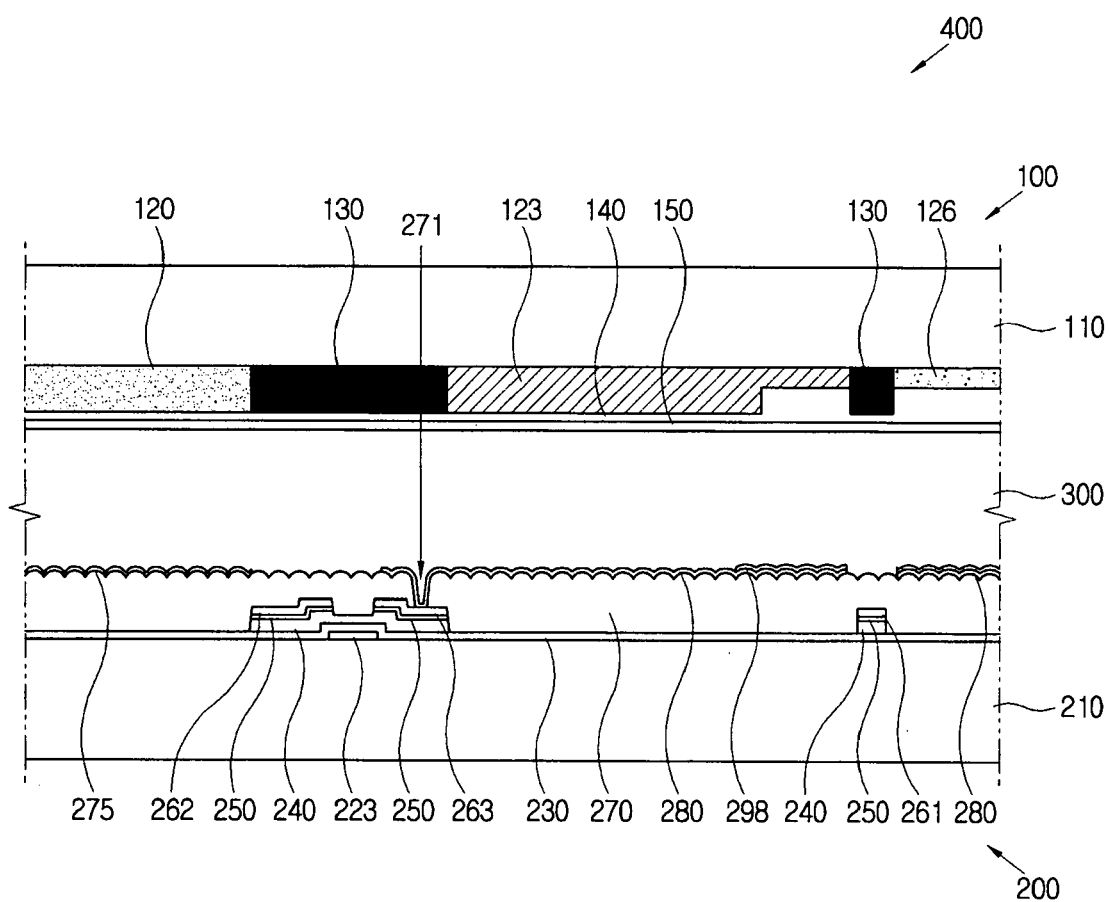
FIG. 3 is a sectional view of the display device, taken along line III-III in FIG. 2.
Figure 4:
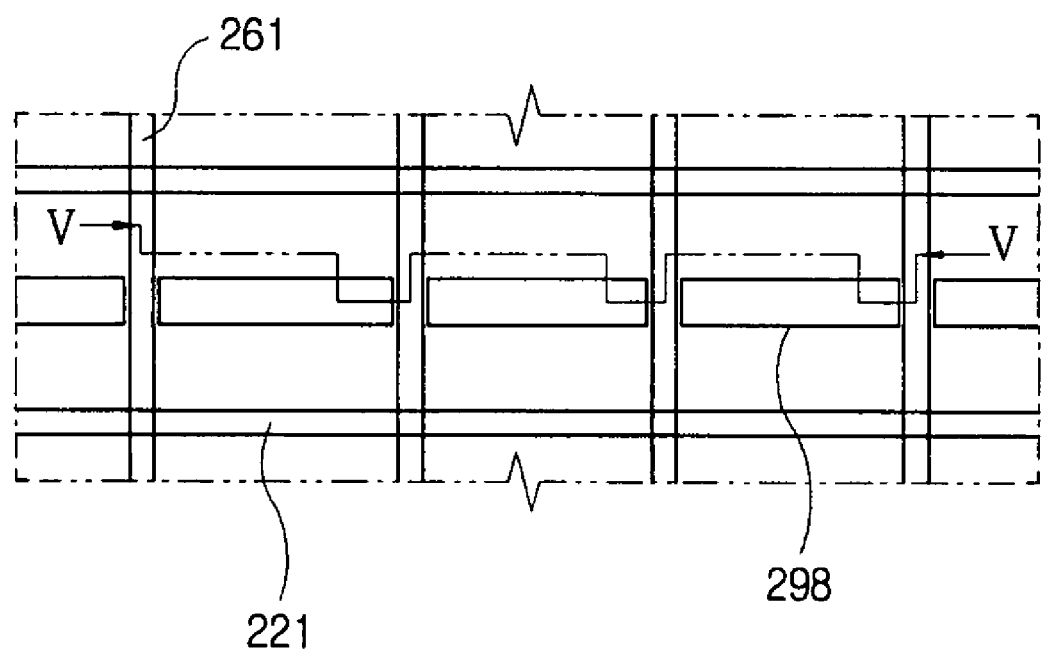
FIG. 4 illustrates schematic thin film transistor substrate according to the first embodiment of the present invention.
Figure 5:
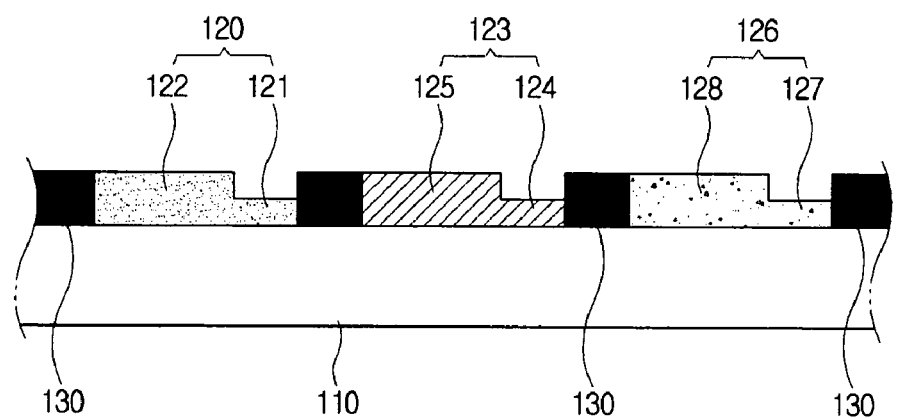
FIG. 5 is a sectional view of a color filter substrate according to the thin film transistor substrate, taken along line V-V in FIG. 4.

FIG. 2 is a plan view of the thin film transistor substrate according to the present invention. FIG. 3 is a sectional view of the thin film transistor substrate, taken along line III-III. FIG. 4 illustrates schematic thin film transistor substrate according to the first embodiment of the present invention. FIG. 5 is a sectional view of a color filter substrate according to the thin film transistor substrate, taken along line V-V in FIG. 4.

A liquid crystal panel 400 according to the present invention comprises a color filter substrate 100; a thin film transistor substrate 200 which faces the color filter substrate 100; and a liquid crystal layer 300 which is interposed between the color filter substrate 100 and the thin film transistor substrate 200.

Referring to FIGS. 2, 3 and 5, the color filter substrate 100 and the thin film transistor substrate 200 will be described.

The first insulating substrate 110 may comprise glass or plastic. Red, green and blue filters are repeatedly formed and spaced from each other on the first insulating substrate 110. The color filters 120, 123 and 126 comprise a photosensitive organic material and assign color to light which is emitted by a backlight unit (not shown) or to natural light and transmitted to the liquid crystal layer 300. As shown in FIG. 3, the color filters 120, 123 and 126 are different in depth. The color filters 120, 123 and 126 are thick in some areas and thin in other areas. A portion of the color filters 120, 123 and 126 corresponding to the reflection layer 298 of the thin film transistor substrate 200 comprises reflectors 121, 124 and 127. The reflectors 121, 124 and 127 are thinner than other portions of the color filters 120, 123 and 126. A portion of the color filters 120, 123 and 126 comprises transmission parts 122, 125 and 128 which are thicker than the reflectors 121, 124 and 127. Light from the backlight unit is transmitted to the outside through the transmission parts 122, 125 and 128. Light from the natural light is reflected on a reflection region through the reflectors 121, 124 and 127 to be transmitted to the outside therethrough. When the thickness of the reflectors 121, 124 and 127 is half the transmission parts 122, 125 and 128, light is transmitted to the reflectors 121, 124 and 127 twice. Then, light which is transmitted to the outside through the reflectors 121, 124 and 127 becomes similar to light which is transmitted through the transmission parts 122, 125 and 128, thereby improving color realization of an LCD device.

The black matrix 130 is formed between the color filters 120, 123 and 126. The black matrix 130 divides the red, green and blue filters and blocks light from being directly emitted to a thin film transistor T on the thin film transistor substrate 200. The black matrix 130 comprises a photosensitive organic material having a black pigment. The black pigment comprises carbon black or titanium oxide.

An overcoat layer 140 is formed on the color filters 120, 123 and 126 and a portion of the black matrix 130 which is not covered by the color filters 120, 123 and 126. The overcoat layer 140 makes the color filters 120, 123 and 126 flat and protects the color filters 120, 123 and 126. The overcoat layer 140 comprises acrylic epoxy, typically.

A common electrode 150 is formed on the overcoat layer 140. The common electrode 150 comprises a transparent conductive material such as indium tin oxide (ITO) or indium zinc oxide (IZO). The common electrode 150 supplies a voltage to the liquid crystal layer 300 together with a pixel electrode 280 of the thin film transistor substrate 200.

Hereinafter, the thin film transistor substrate 200 according to the present invention will be described in detail.

The thin film transistor T is provided on a second insulating substrate 210 which comprises glass or plastic.

The thin film transistor T comprises a gate electrode 223; a gate insulating layer 230 which covers the second insulating substrate 210 and the gate electrode 223; a semiconductor layer 240 which is formed on the gate insulating layer 230 of the gate electrode 223; an ohmic contact layer 250 which is separated by the gate electrode 223 on the semiconductor layer 240; and a source electrode 262 and a drain electrode 263 which are respectively provided on the separated ohmic contact layer 250.

The gate electrode 223 is branched from a gate line 221 which extends in a predetermined direction. Gate wires 221 and 223 comprise the gate line 221; a gate electrode 223; and a gate pad (not shown) which is provided on a circumference of the gate line 221 and receives a signal from the outside.

The source electrode 262 is branched from a data line 261 which insulatedly crosses the gate line 221. The drain electrode 263 is spaced from the source electrode 262 and forms a channel area, with the gate electrode 223 interposed therebetween. Data wires 261, 262 and 263 comprise the data line 261; the source electrode 262; the drain electrode 263; and a data pad (not shown) which is provided on a circumference of the data line 261 and receives a signal from the outside.

A passivation layer 270 is formed on the data wires 261, 262, 263 and 164 and the semiconductor layer 240 exposed therebetween. An uneven pattern 275, a drain contact hole 271 through which the drain electrode 263 is exposed, are formed on the passivation layer 270. The uneven pattern 275 is formed on the passivation layer 270 to diffuse light and increase light reflection ratio.

The pixel electrode 280 is formed on the passivation layer 270 having the uneven pattern 275. The pixel electrode 280 comprises a transparent conductive material such as indium tin oxide (ITO) or indium zinc oxide (IZO). The pixel electrode 280 is electrically connected with the drain electrode 263 through the drain contact hole 271. An uneven pattern is formed on the pixel electrode 280 by the uneven pattern 275 of the passivation layer 270.

The reflection layer 298 is formed on a portion of the pixel electrode 280. The gate line 221 and the data line 261 insulatedly cross each other to define a pixel region. The pixel region comprises a transmission region on which the reflection layer 298 is not formed; and a reflection region on which the reflection layer 298 is formed. In the transmission region without the reflection layer 298, light from the backlight unit is transmitted to the outside of the liquid crystal panel 400. In the reflection region with the reflection layer 298, light from the outside is reflected and emitted back to the outside of the liquid crystal panel 400. The reflection layer 298 comprises aluminum or silver, or a double layer having an aluminum layer and a molybdenum layer. The reflection layer 298 is electrically connected with the drain electrode 263 through the drain contact hole 271. An uneven pattern is formed on the reflection layer 298 by the uneven pattern 275 of the pixel electrode 280.

Hereinafter, a method of manufacturing the color filter substrate 100 having the two tone color filter will be described with reference to FIGS. 6a to 6i.

Figure 6A:
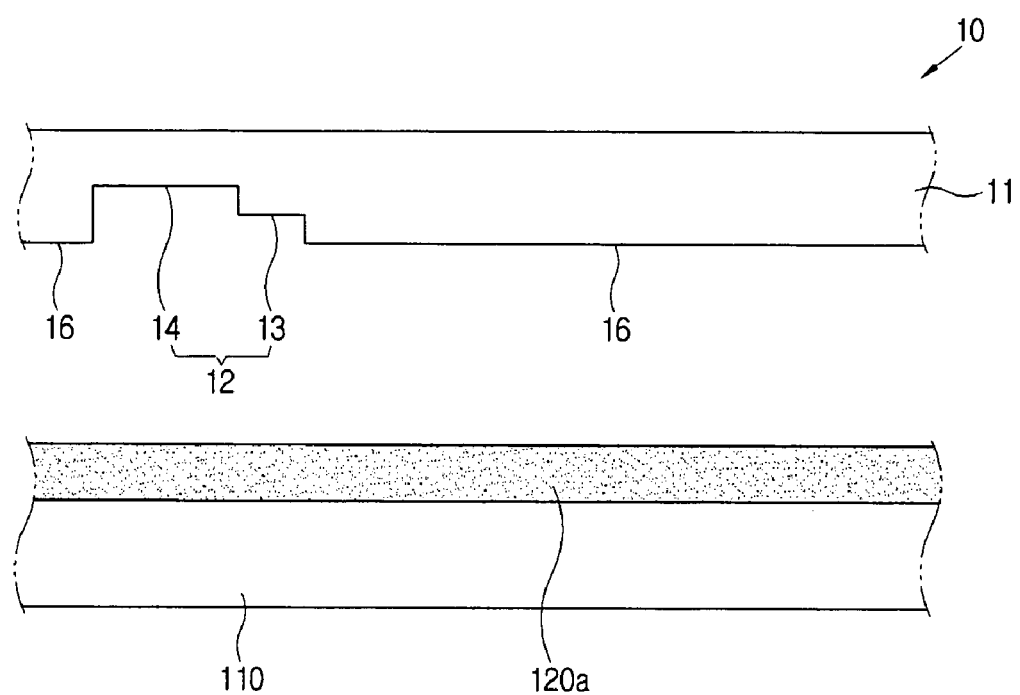
FIGS. 6*a* to 6*i* illustrate a manufacturing method of a color filter substrate according to the first embodiment of the present invention.

As shown in FIG. 6a, a first color filter layer 120a is formed on the first insulating substrate 110. The first color filter layer 120a comprises a photosensitive material having one of red, green and blue colors. The first mold for the display device 110 is arranged on or paced in registration with a predetermined portion the first insulating substrate 110.

Figure 6B:
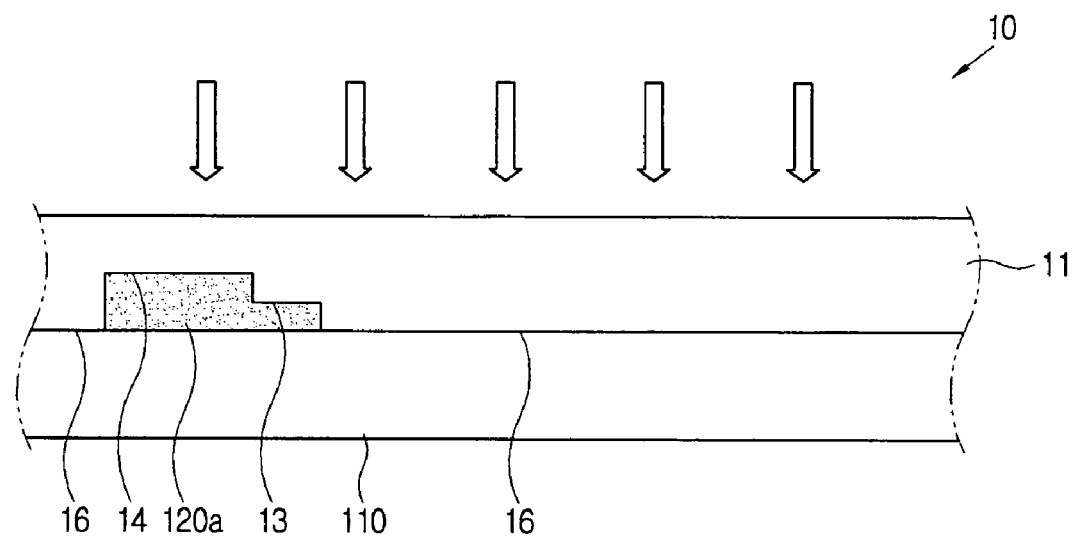

As shown in FIG. 6b, the first mold for the display device 10 and the first insulating substrate 110 are brought together to form a pattern on the first color filter layer 120a corresponding to the pattern forming part 12.

Figure 6C:
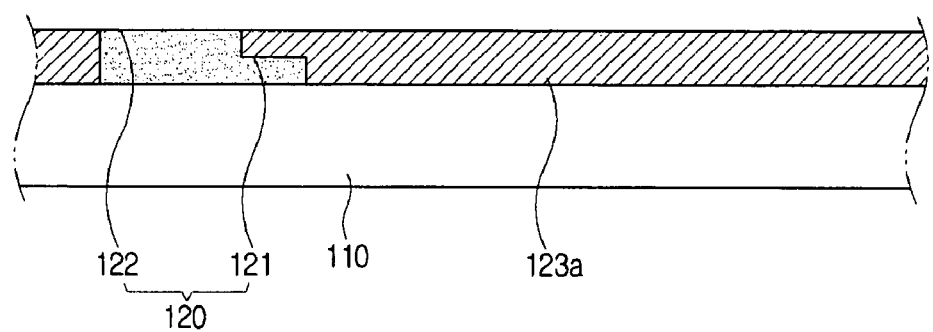

As shown in FIG. 6c, the first mold for the display device 10 is separated from the first insulating substrate 110 to complete the first color filter 120 having a first reflector 121 corresponding to the first region 13 and a first transmission part 122 corresponding to the second region 14. The first color filter 120 may be exposed and cured by a mask (not shown) which has an opening exposing the first color filter 120. The shape of the first color filter 120 is maintained in the next process, thereby forming the first color filter 120 more precisely.

Figure 6D:
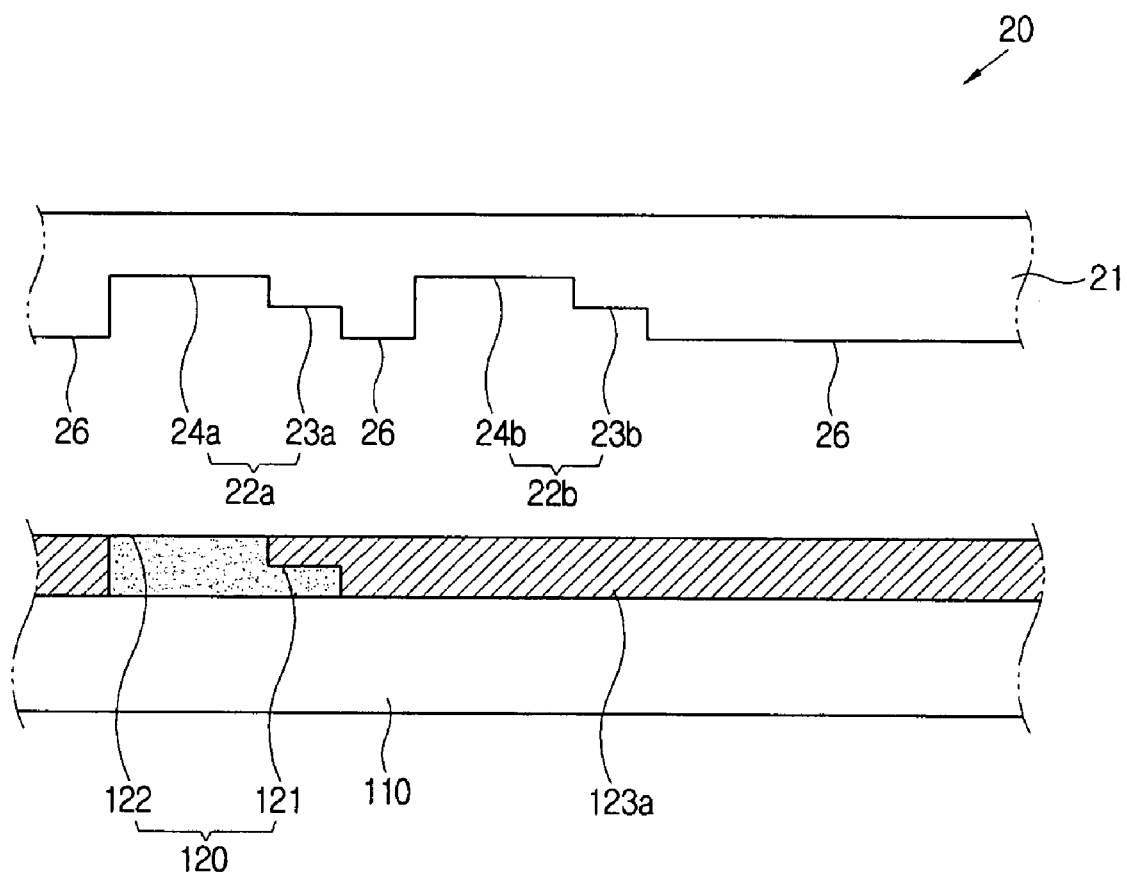

A second color filter layer 123a is formed on the first insulating substrate 110 having the first color filter 120. As shown in FIG. 6d, the second mold for the display device 20 is arranged on the first insulating substrate 110. More specifically, the second mold for the display device 20 is arranged on the first insulating substrate 110 so that one of the pattern forming parts 22a and 22b is in registration with the first color filter 120. The shape of the first color filter 120 is maintained in the next process.

Figure 6E:
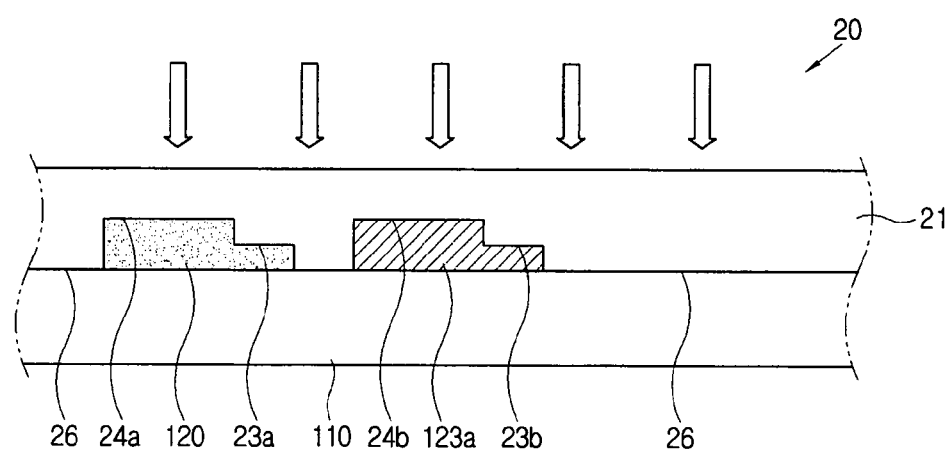

As shown in FIG. 6e, the second mold for the display device 20 and the first insulating substrate 110 are pressed together to form a pattern on the second color filter layer 120a corresponding to the pattern forming part 22b.

Figure 6F:
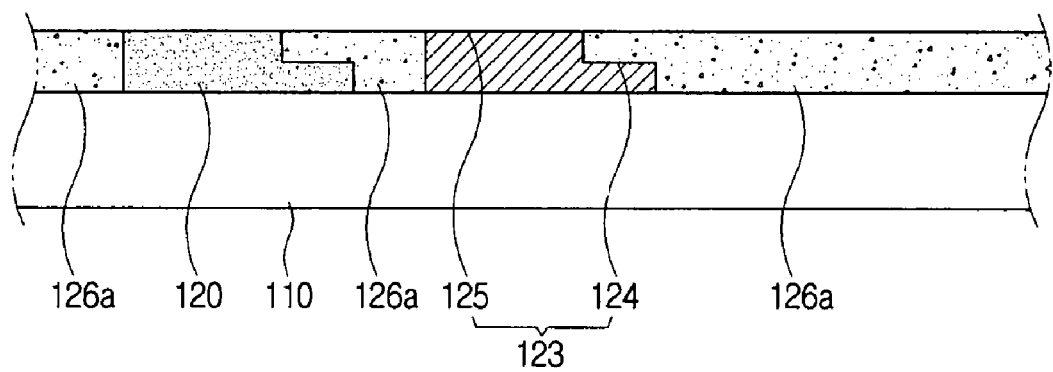

As shown in FIG. 6f, the second mold for the display device 20 is separated from the first insulating substrate 110 to complete the second color filter 123 having a second reflector 124 corresponding to the first region 23b and a second transmission part 125 corresponding to the second region 24b. Like the first color filter 120, the second color filter 123 is preferably cured, too.

As shown therein, a third color filter layer 126a is formed on the first insulating substrate 110 having the first and second color filters 120 and 123.

Figure 6G:
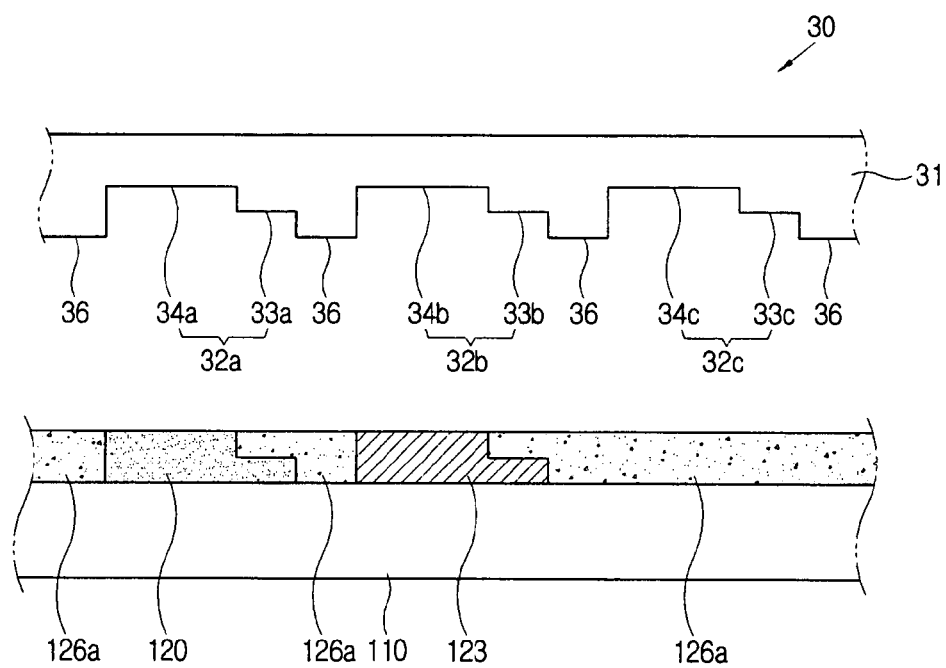

As shown in FIG. 6g, the third mold for the display device 30 is arranged on the first insulating substrate 110. More specifically, the third mold for the display device 30 is registered on the first insulating substrate 110 so that two of the pattern forming parts 32a, 32b and 32c correspond to the first and second color filters 120 and 123. Accordingly, the shape of the first and second color filters 120 and 123 is maintained in the next process.

Figure 6H:
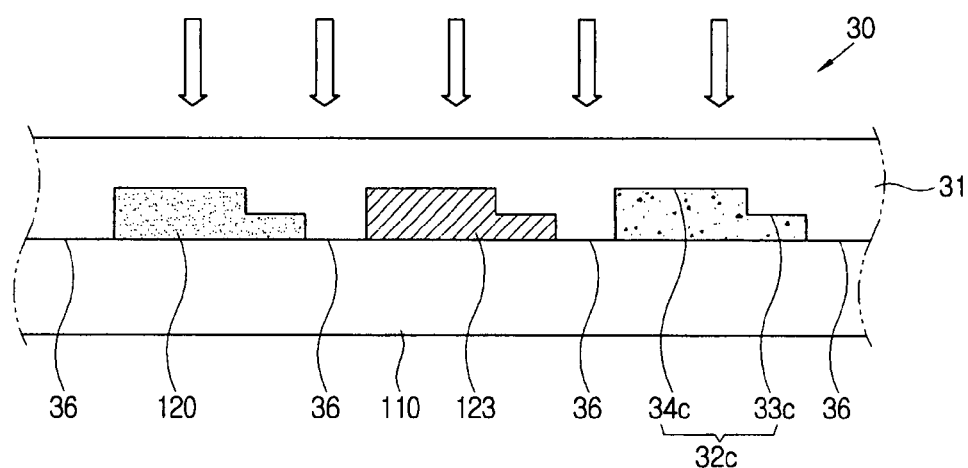

As shown in FIG. 6h, a third mold for the display device 30 is pressed toward the first insulating substrate 110 to form a pattern on the third color filter layer 126a corresponding to the pattern forming part 32c.

Figure 6I:
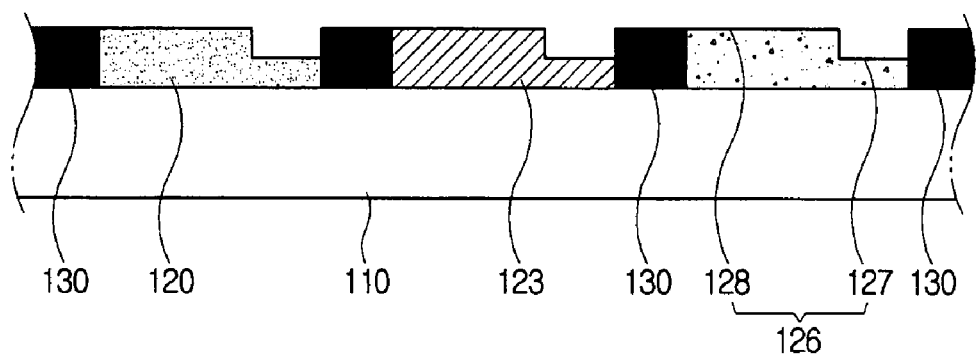

As shown in FIG. 6i, the third mold for the display device 30 is separated from the first insulating substrate 110 to complete the third color filter 126 having a third reflector 127 corresponding to the first region 33c and a third transmission part 128 corresponding to the second region 34c. Like the first color filter 120, the third color filter 126 is preferably cured, too. As necessary, the mask having the opening part in a predetermined pattern may be used to remove remaining layers between the first and second color filters 120 and 123, between the second and third color filters 123 and 126, and between the first and third color filters 120 and 126.

As shown in FIG. 6i, the black matrix 130 is formed between the first and second color filters 120 and 123, between the second and third color filters 123 and 126, and between the first and third color filters 120 and 126 through known methods.

As shown in FIG. 3, the overcoat layer 140 and the common electrode 150 are formed according to known methods, to complete the color filter substrate 100 having the two tone color filter.

In other embodiment, the color filter is formed after the black matrix is formed. In this case, each mold 10, 20, 30 may have additional depressed part to accommodate the black matrix and maintain the shape of the black matrix.

Hereinafter, a method of forming the two tone color filter with red, green and blue color filters by using a mold for a display device 30a will be described with reference to FIGS. 7a to 7i.

Figure 7A:
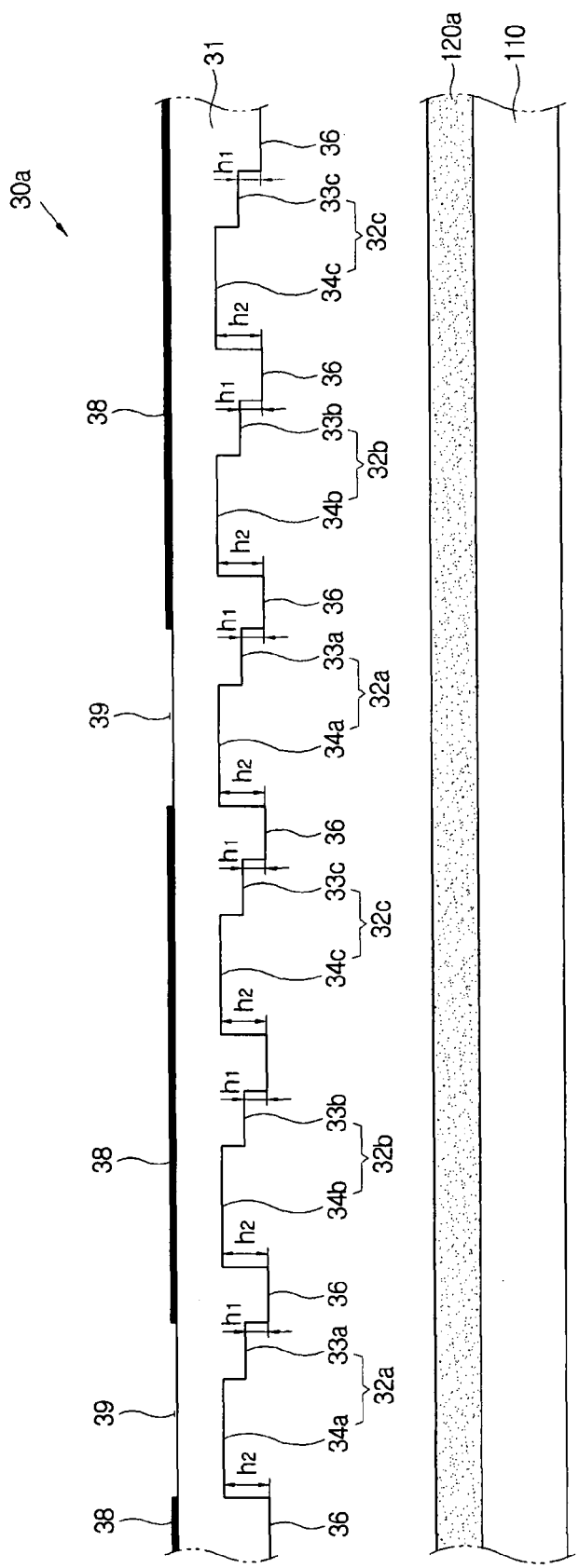

As shown in FIG. 7a, the mold for the display device 30a comprises the pattern forming parts 32a, 32b and 32c which are repeatedly formed on the first side of supporting frame 31 and spaced from each other at a predetermined interval. The pattern forming parts 32a, 32b and 32c comprise the first regions 33a, 33b and 33c which are depressed to the depth h1; and the second regions 34a, 34b and 34c which have a stair shape and depressed to the depth h2 deeper than the first regions 33a, 33b and 33c, respectively. The interval between the pattern forming parts 32a, 32b and 32c comprises the organic layer removing part 36. A light-blocking film 38 having the opening part 39 is formed on the back side of supporting frame 31 corresponding to one of the pattern forming parts 32a, 32b and 32c.

As shown in FIG. 7a, the first color filter layer 120a is formed on the first insulating substrate 110. The first color filter layer 120a comprises a photosensitive material having one of red, green and blue colors. The mold for the display device 30a is arranged on the first insulating substrate 110.

Figure 7B:
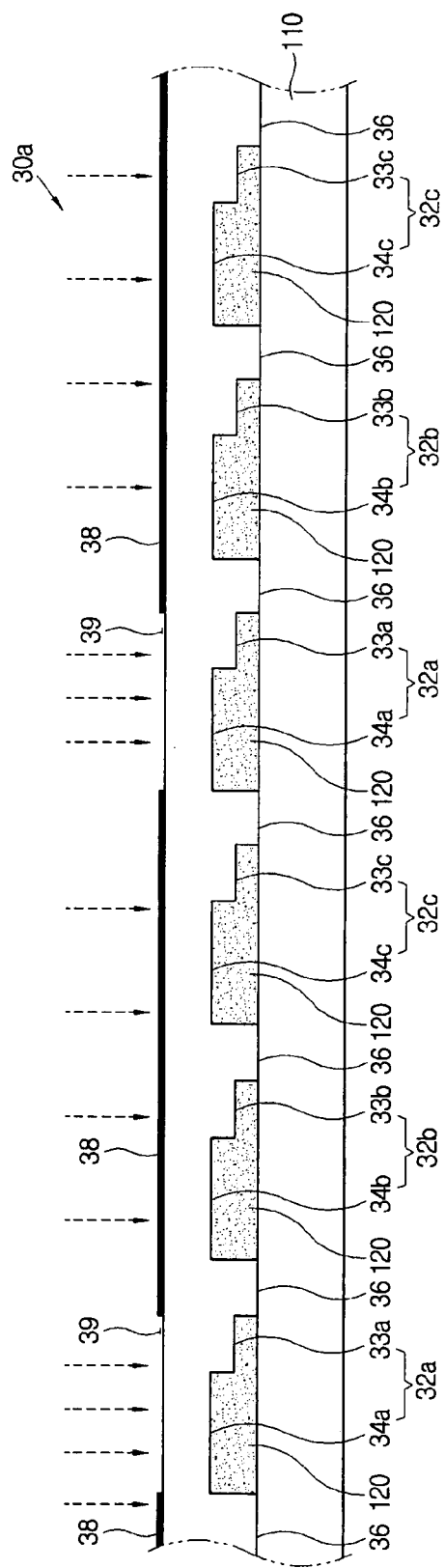

As shown in FIG. 7b, the mold for the display device 30a is pressed toward the first insulating substrate 110 to form the first color filter 120 corresponding to the pattern forming parts 32a, 32b and 32c. The first color filter 120 corresponding to the opening part 39 is exposed to light and then cured.

Figure 7C:
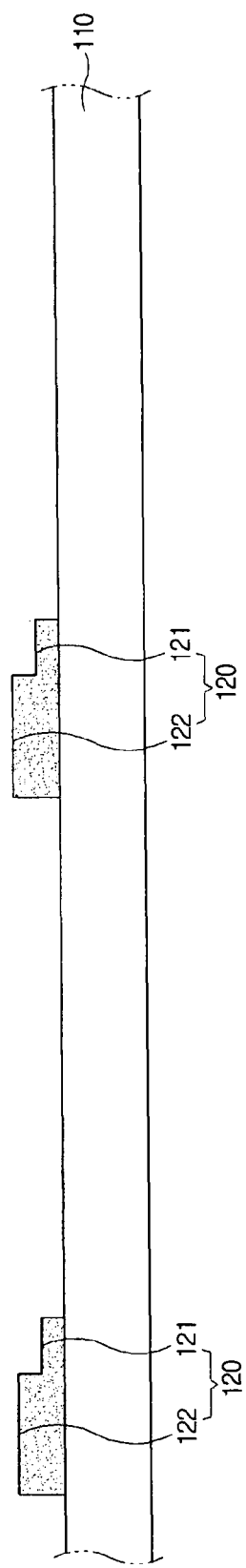

As shown in FIG. 7c, the mold for the display device 30a is separated from the first insulating substrate 110 and the color filter 120 which is not cured is removed to complete the first color filter 120 having the first reflector 121 corresponding to the first region 33a and the first transmission part 122 corresponding to the second region 34a.

Figure 7D:
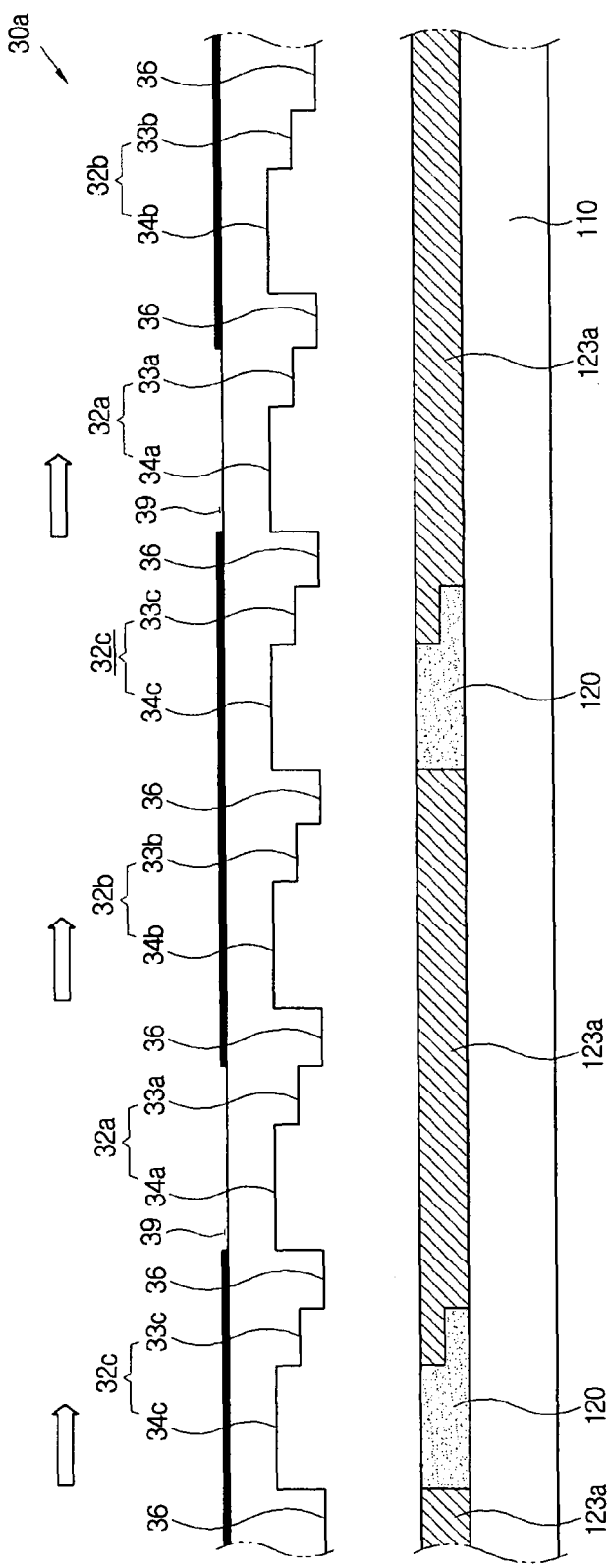

As shown in FIG. 7d, a second color filter layer 123a is formed on the first insulating substrate 110 having the first color filter 120, and then the mold for the display device 30a is moved and arranged on the first insulating substrate 110 so that the pattern forming part 32c adjacent to the opening part 39 corresponds to the first color filter 120. For example, when the pattern forming part corresponding to the opening part 38 comprises the first pattern forming part 32a, and when the pattern forming parts on the right side of the opening part 38 comprise the second and third pattern forming parts 32b and 32c, the mold for the display device 30a is moved and arranged on the first insulating substrate 110 so that the third pattern forming part 32c corresponds to the first color filter 120.

Figure 7E:
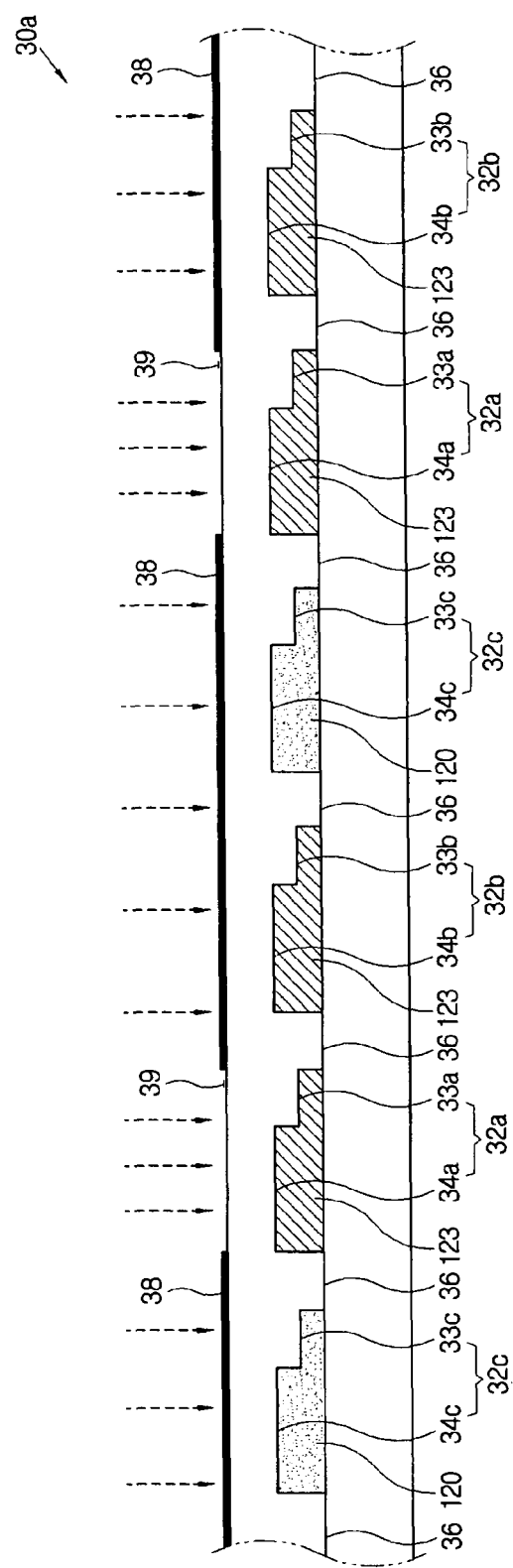

As shown in FIG. 7e, the mold for the display device 30a is pressed toward the first insulating substrate 110 to form the second color filter 123 corresponding to the pattern forming parts 32a, 32b. The second color filter 123 corresponding to the opening part 39 is exposed to light and then cured.

Figure 7F:
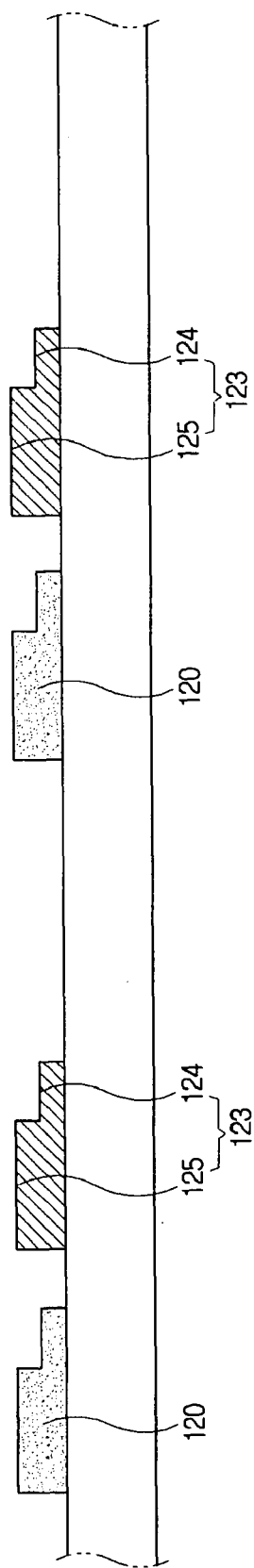

As shown in FIG. 7f, the mold for the display device 30a is separated from the first insulating substrate 110 and the second color filter 123 which is not cured is removed to complete the second color filter 123 having the second reflector 124 corresponding to the first region 33a and the second transmission part 125 corresponding to the second region 34a. The shape of the first color filter 120 is maintained by the third pattern forming part 32c in the next process.

As shown in FIG. 7g, the third color filter layer 126a is formed on the first insulating substrate 110 having the first and second color filters 120 and 123, and then the mold for the display device 30a is moved and arranged on the first insulating substrate 110 so that the pattern forming parts 32b and 32c adjacent to the opening part 39 correspond to the first and second color filters 120 and 123.

Figure 7H:
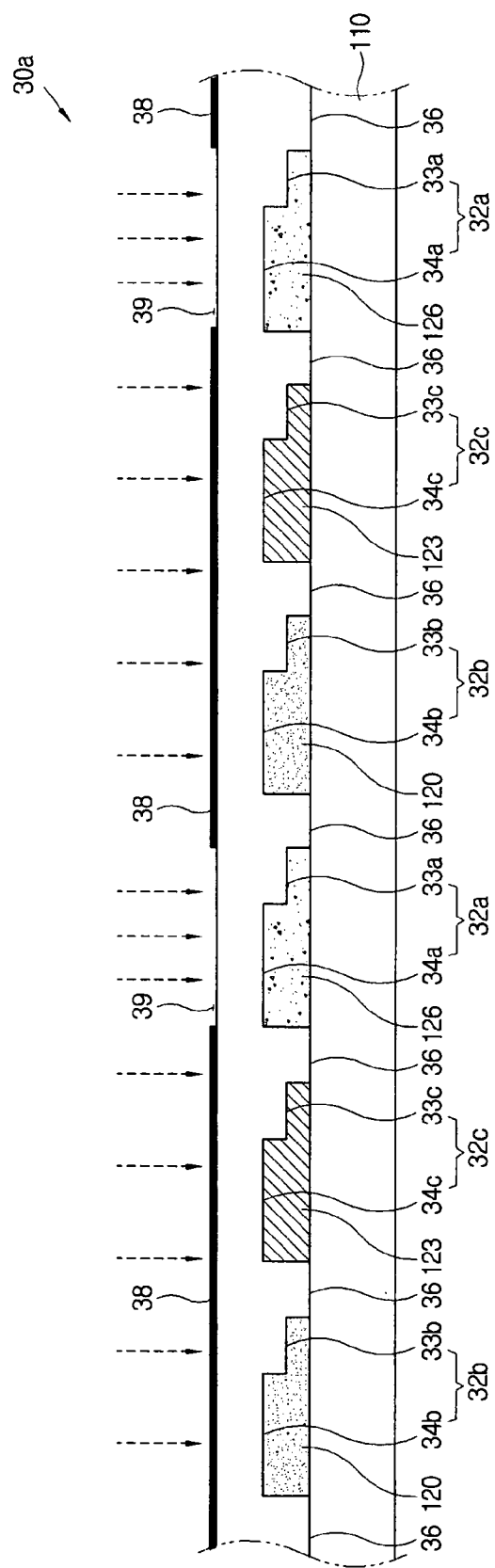
Figure 71:
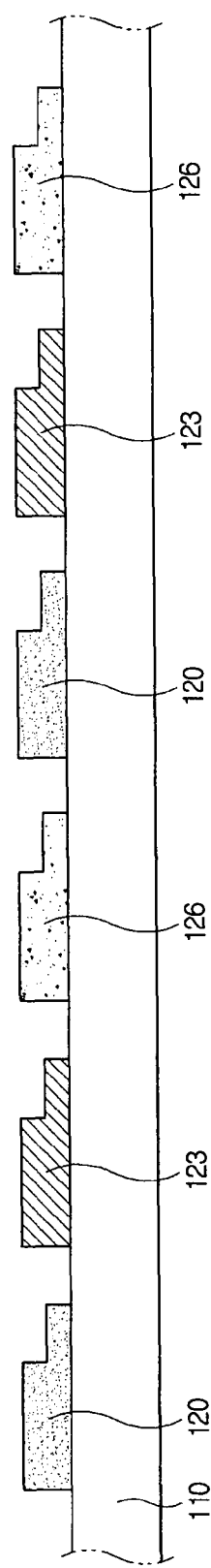

As shown in FIG. 7h, the mold for the display device 30a is pressed toward the first insulating substrate 110 to form the third color filter 126 corresponding to the pattern forming parts 32c. The third color filter 126 corresponding to the opening part 39 is exposed to light and then cured.

As shown in FIG. 7i, the mold for the display device 30a is separated from the first insulating substrate 110 to complete the third color filter 126 having the third reflector 127 corresponding to the first region 33a and the third transmission part 128 corresponding to the second region 34a. The shape of the first and second color filters 120 and 123 is maintained by the second and third pattern forming parts 32b and 32c in the next process.

A color filter which possibly remains on an area where the first through third color filters 120, 123 and 126 are not formed, may be removed as necessary.

With the foregoing method, the two tone color filter may be manufactured through the mold for the display device, without photolithography. Further, the shape of the color filter may be more precise and the yield thereof increases.

In other embodiment, the color filter is formed after the black matrix is formed. In this case, the mold for the display device 30a may have additional depressed part to accommodate the black matrix and maintain the shape of the black matrix.

Hereinafter, a method of manufacturing the thin film transistor substrate 200 which uses the mold for the display device 40 having a plurality of steps will be described.

The mold for the display device 40 (refer to FIG. 8d) is used to have a photosensitive layer having different depth and to reduce the number of a mask used in manufacturing the thin film transistor. As shown in FIG. 6d, the mold for the display device 40 comprises a pattern forming part 42 which includes a first region 43 that is depressed to a predetermined depth h1; and a second region 44 which is provided as a pair, with the first region 43 interposed therebetween. The depth h2 of the depressed second region 44 is deeper than the first region 43. The pattern forming part 42 is provided on a first side of the supporting frame 41. An organic layer removing part 46 is formed on a circumference of the pattern forming part 42 to remove areas except the pattern-formed area. A groove 48 is spaced from the pattern forming part 42 at a predetermined interval. A depth h3 of the groove 48 is substantially identical to the depth h2 of the first region 44.

Figure 8A:
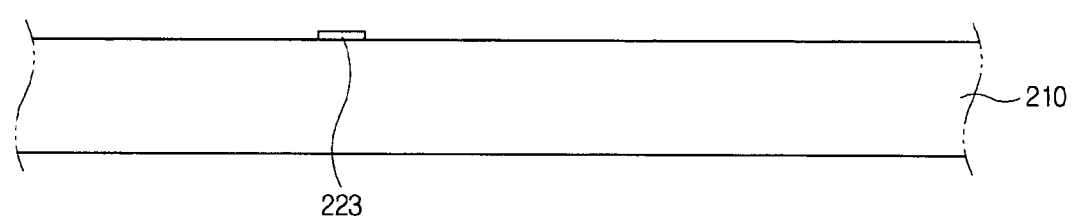

As shown in FIG. 8a, a gate metal layer is deposited and patterned on the second insulating substrate 210 to form a gate line 221 (refer to FIG. 2), a gate electrode 223 and a gate pad (not shown).

Figure 8B:
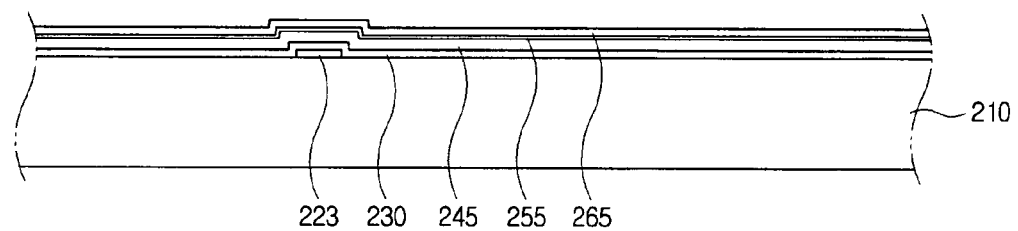

As shown in FIG. 8b, a gate insulating layer 230, a semiconductor layer 245, an ohmic contact layer 255 and a data metal layer 265 are formed.

Figure 8C:
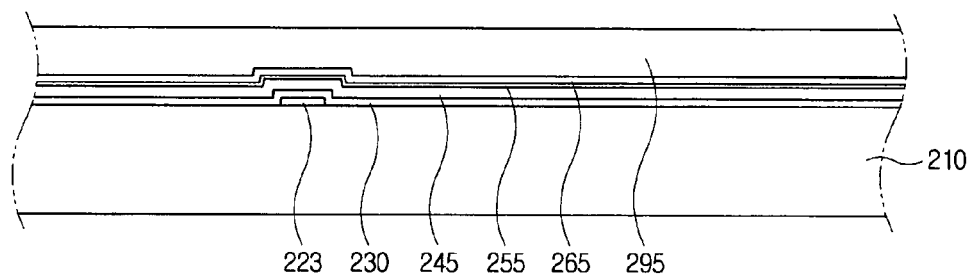

As shown in FIG. 8c, a photosensitive material layer 295 is formed on the data metal layer 265.

Figure 8D:
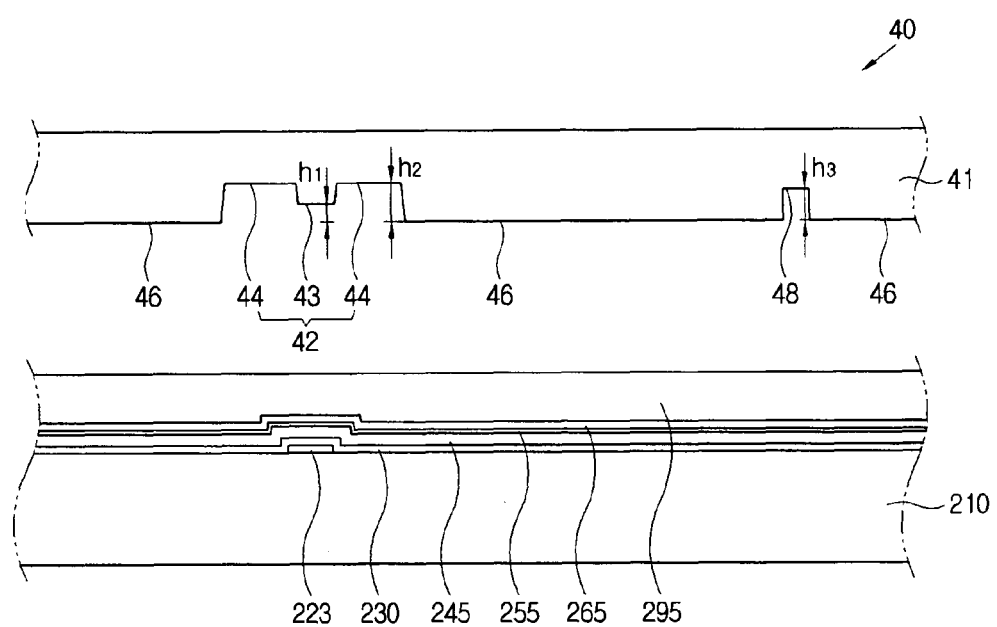
Figure 8E:
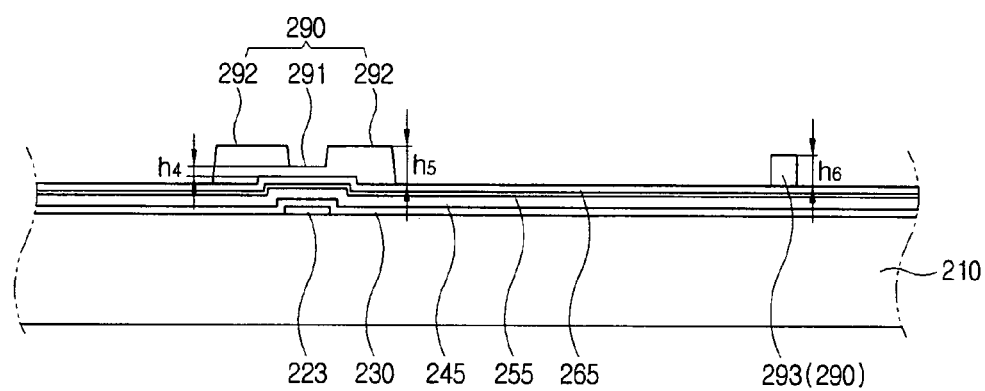

As shown in FIG. 8d, the mold for the display device 40 is arranged on the second insulating substrate 210. More specifically, the mold for the display device 40 is arranged on the second insulating substrate 210 so that the first region 43 and the groove 48 correspond to the gate electrode 223 and the data line 261 crossing the gate line 221, respectively.

Then, the mold for the display device 40 is pressed toward the second insulating substrate 210 to form a photosensitive layer 290 which comprises a first portion 291 corresponding to the first region 43 and a second portion 292 corresponding to the second region 44. The photosensitive layer 290 further comprises a third portion 293 which corresponds to the groove 48.

A depth h4 of the first portion 291 of the photosensitive layer 290 is lower than a depth h6 of the third portion 293 on which the data line 261 is formed. The depth s h5 and h6 of the second and third portions 292 and 293 is substantially identical to each other.

The photosensitive layer 290 is removed except the area corresponding to the pattern forming part 42 and the groove 48. The ratio between the depth h4 of the first portion 291 and the depth s h5 and h6 of the second and third portions 292 and 293 may be set according to processing conditions in an etching process (to be described later). Preferably, the depth h4 of the first portion 291 is half the depth s h5 and h6 of the second and third portions 292 and 293. For example, the depth h4 of the first portion 291 is 4,000 Å or less.

The photosensitive layer 290, the data metal layer 265, the ohmic contact layer 255 and the semiconductor layer 245 are etched. Here, the data metal layer 265, the ohmic contact layer 255 and the semiconductor layer 245 remain below the second and third portions 292 and 293. The semiconductor layer 240 (refer to FIG. 3) alone remains below the first portion 291. The data metal layer 265, the ohmic contact layer 255 and the semiconductor layer 245 are removed on the area where the photosensitive layer 290 is not formed, to expose the gate insulating layer 230.

Figure 8F:
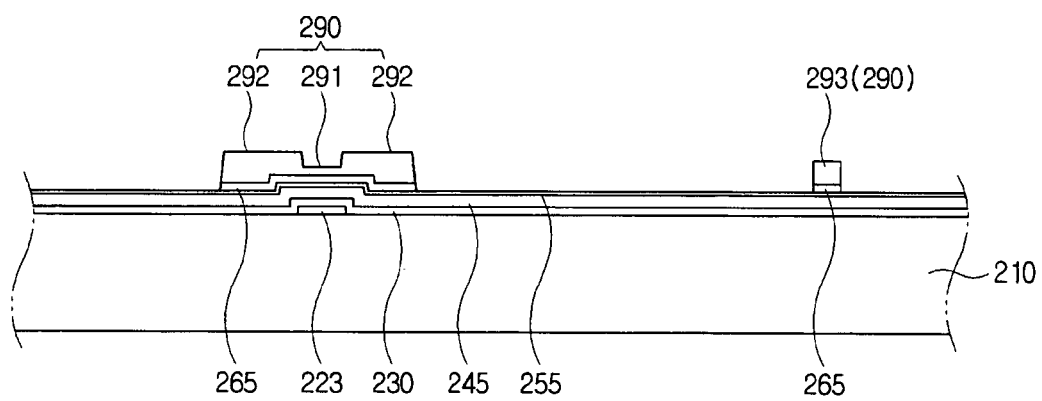
Figure 8G:
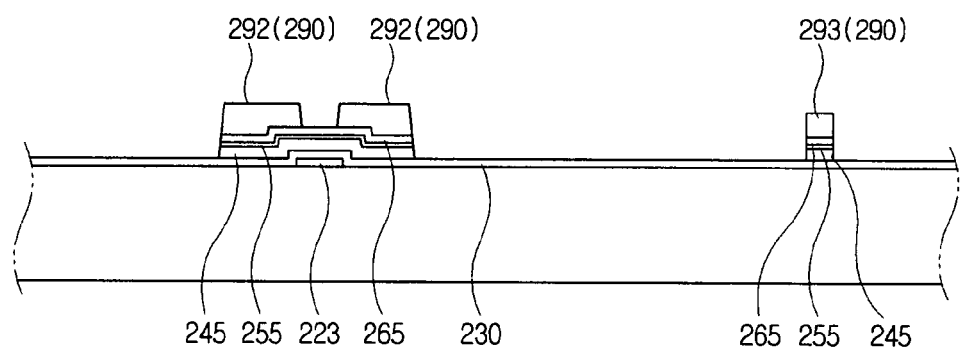

As shown in FIG. 8f, the data metal layer 265 is removed on the area where the photosensitive layer 90 is not formed, to expose the ohmic contact layer 255. Then, the data metal layer 265 is removed on the area where the photosensitive layer 290 is not formed, thereby exposing the ohmic contact layer 255. The remaining data metal layer 265 is identical to the data wires 261, 262 and 263 except that the source and drain electrodes 262 and 263 are connected. As shown in FIG. 6g, the exposed ohmic contact layer 255 and the semiconductor layer 245 are simultaneously removed together with the first portion 291 of the photosensitive layer 290, through a dry etching method. As shown in FIG. 6g, the first portion 291 of the photosensitive layer 290 is removed to expose the data metal layer 265. The ohmic contact layer 255 and the semiconductor layer 245 are removed on the area where the photosensitive layer 290 is not formed, to expose the gate electrode layer 230. Meanwhile, the third portion 293 of the photosensitive layer 290 is also etched and decreases in thickness.

Any remainder of the photosensitive layer 290 on the data metal layer 265 is removed through ashing.

Figure 8H:
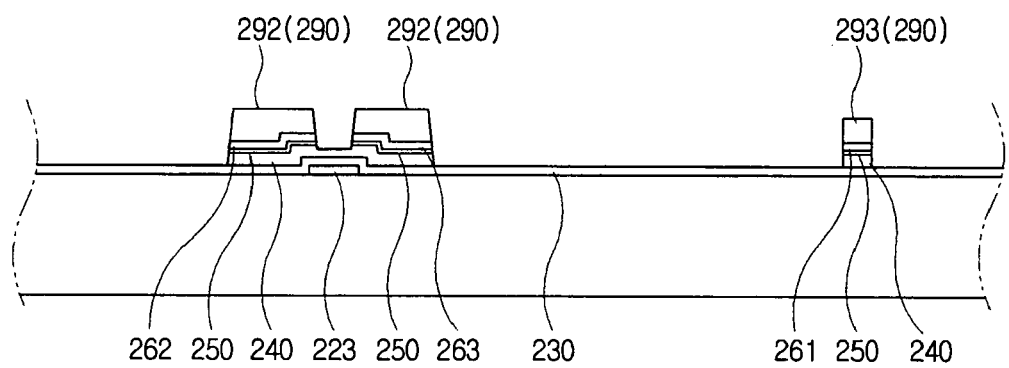
Figure 81:
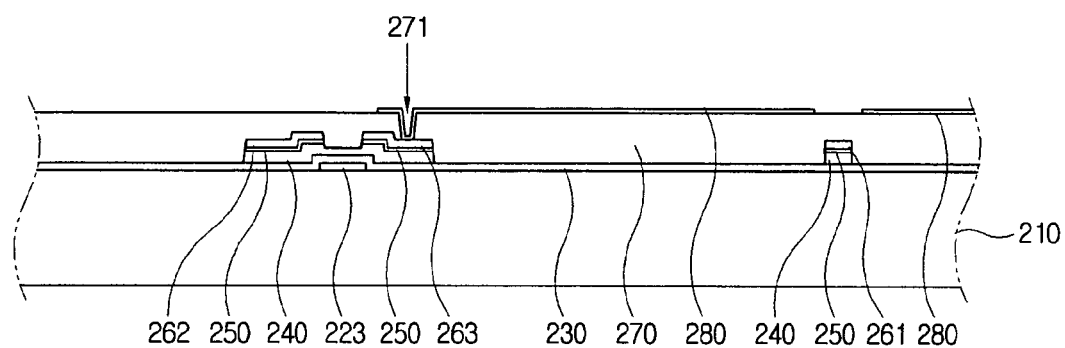

As shown in FIG. 8h, the data metal layer 265 disposed between the second portions 292, and the ohmic contact layer 255 are etched and removed.

Then, the source electrode 262, the drain electrode 263 and the ohmic contact layer 250 which are spaced from each other with respect to the gate electrode 223, are formed as shown in FIG. 6h. A portion of the semiconductor layer 240 may be removed to reduce its thickness.

After removing the remaining photosensitive layer 290 (refer to FIG. 6h), the passivation layer 270 is formed on the ohmic contact layer 250, the source electrode 262 and the drain electrode 263 (refer to FIG. 6i). The contact hole 271 is formed on the passivation layer 270 to expose the drain electrode 263. The passivation layer 270 may comprise an organic insulating layer having an organic material, a silicon nitride, an a-Si:C:O or a-Si:C:F.

The uneven pattern 275 is formed on the passivation layer 270 through known methods of manufacturing the semi-transmission type LCD device. The reflection layer 298 is formed on a portion of the pixel electrode 280 to complete the thin film transistor substrate 200, which is applicable to the semi-transmission type LCD device.

As described above, the present invention provides a manufacturing method of a display device having a simplified manufacturing process and a mold for a display device therefor.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A method of manufacturing a display device, comprising:
   forming a first color filter layer on an insulating substrate;
   bringing together the insulating substrate and a first mold to form a first color filter;
   forming a second color filter layer on the insulating substrate;
   bringing together the insulating substrate and a second mold to form a second color filter;
   forming a third color filter layer on the insulating substrate; and
   bringing together the insulating substrate and a third mold to form a third color filter,
   wherein, each mold comprises a supporting frame having on its first side preformed depressed pattern forming parts and an organic layer removing part formed on the circumference of the pattern forming parts, the pattern forming part having first and second depressions of different depths,
   wherein the first mold comprises one first depressed pattern forming parts and the second mold comprises two second depressed pattern forming parts which are adjacent to each other and the third mold comprises three third depressed pattern forming parts,
   wherein the second mold is arranged on the insulating substrate so that one of the two second depressed pattern forming parts corresponds to and abuts the first color filter,
   wherein the third mold is arranged on the insulating substrate so that two of the three third depressed forming parts corresponds to and abuts the first color filter and the second color filter respectively.

2. The method according to claim 1, further comprising:
   curing the first color filter after forming the first color filter and before forming the second color filter layer.

3. The method according to claim 2, further comprising:
   arranging the second mold so that one of the two second pattern forming parts corresponds to the first color filter, after forming the second color filter layer.

4. The method according to claim 3, further comprising:
curing the second color filter after forming the second color filter and before forming the third color filter layer.

5. The method according to claim 4, further comprising:
arranging the third mold so that two of the three third pattern forming parts correspond to the first and second color filters, after forming the third color filter layer.

6. The method according to claim 5, further comprising:
curing the third color filter after forming the third color filter.

7. The method according to claim 6, further comprising:
removing a layer between the first and second color filters, between the second and third color filters, and between the first and third color filters.

8. The method according to claim 1, further comprising:
forming a black matrix between the first and second color filters, between the second and third color filters, and between the first and third color filters.

9. A method of manufacturing a display device, comprising:
providing a mold comprising a supporting frame having on its first side and abuts first, second, and third depressed pattern forming parts and an organic layer removing part formed on the circumference of the pattern forming parts; and a light blocking film having an opening part corresponding the first pattern forming part is formed on one of first and second sides of the supporting frame, the pattern forming part having first and second depressions of different depths;
forming a first color filter layer on an insulating substrate;
pressing together the mold and the insulating substrate to form a first color filter corresponding to the first, second, and third pattern forming parts;
exposing the first color filter through the opening while the mold and the insulating substrate are pressed together to eliminate the first color filter which is not exposed;
forming a second color filter layer on the insulating substrate;
arranging the mold and the insulating substrate, the first color filter corresponds to and abuts one of the second and third pattern forming parts;
pressing together the mold and the insulating substrate to form a second color filter corresponding to the first, second, and third pattern forming parts;
exposing the second color filter through the opening while the mold and substrate are pressed together to eliminate the second color filter which is not exposed;
forming a third color filter layer on the insulating substrate;
arranging the mold and the insulating substrate, the first color filter corresponds and abuts one of the second and third pattern forming parts and the second color filter corresponds to abuts the other of the second and third pattern forming parts; and
pressing together the mold and the insulating substrate to form a third color filter corresponding to the first, second, and third pattern forming parts; and
exposing the third color filter through the opening while the mold and the insulating substrate are pressed together to eliminate the third color filter which is not exposed.

10. The method according to claim 9, further comprising:
removing from the insulating substrate any unexposed and uncured portion of the color filter layers.

11. The method according to claim 9, further comprising:
forming a black matrix between the first and second color filters, between the second and third color filters, and between the first and third color filters.

* * * * *